May 3, 1932.  A. E. YOUNG  1,856,528
MEASURING APPARATUS
Filed Oct. 4, 1929
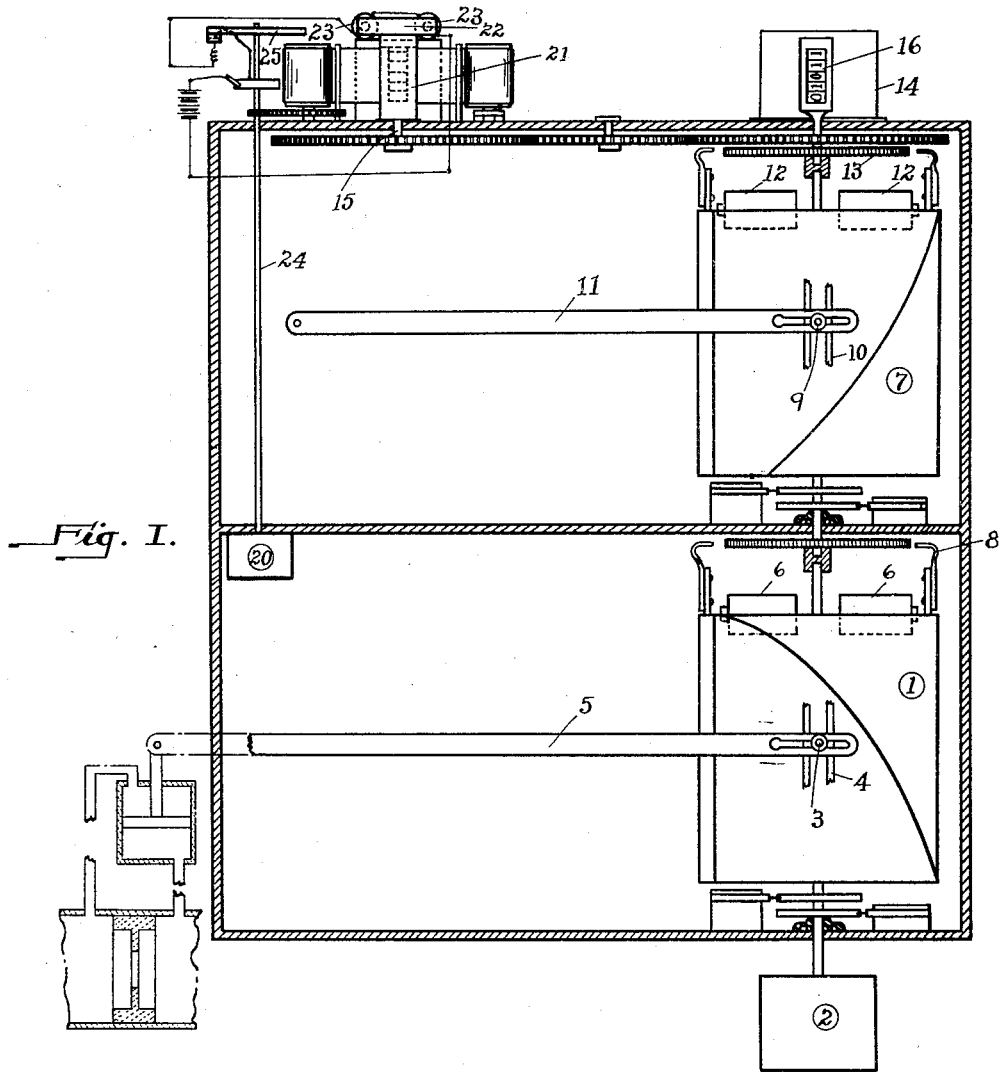
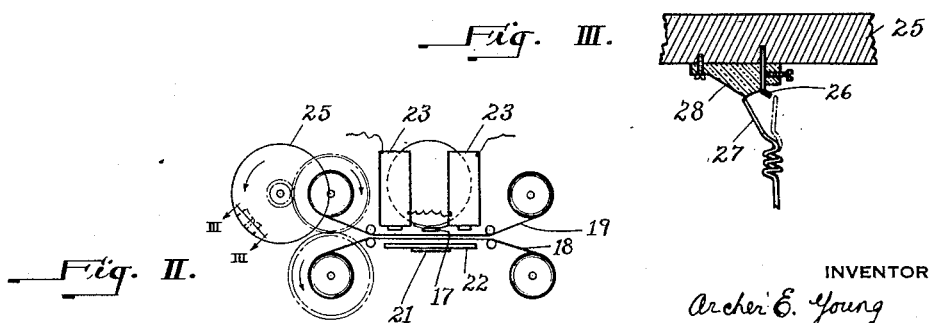
INVENTOR
Archer E. Young
by Christy, Christy and Wharton
his attorneys Patented May 3, 1932

1,856,528

UNITED STATES PATENT OFFICE

ARCHER E. YOUNG, OF PITTSBURGH, PENNSYLVANIA

MEASURING APPARATUS

Application filed October 4, 1929. Serial No. 397,262.

My invention relates to improvements in measuring apparatus, and, more specifically, to the making of legible record at successive and advantageously equal intervals of time of the reading of a tally. The invention is illustrated in the accompanying drawings, in which Fig. I is a view in vertical section, and illustrates somewhat diagrammatically gas measuring apparatus including a tally, and in connection with the tally the recording mechanism of my invention. Fig. II is a view in plan, somewhat diagrammatic in character, of the recording apparatus shown in Fig. I. Fig. III is a fragmentary view to larger scale and in vertical section, illustrating a detail. The plane of section is indicated at III—III, Fig. II.

The measuring apparatus includes a rotating cylinder 1 driven by clockwork 2 whose surface is in part electrically conducting and in part non-conducting. Co-operating with the rotating cylinder 1 is a brush-equipped electric terminal, borne by a block 3, which is movable along ways 4, in parallelism with the surface of cylinder 1. A swinging lever 5 with slotted end engages the block 3, and as it swings is effective to move the block 3 along its ways. The lever 5 swings in response to the differential pressure across an orifice in a gas main. According as the brush borne by the block 3 makes contact with a conducting surface of the cylinder, or passes over a non-conducting portion of the surface of the cylinder, electro-magnets 6 borne by the cylinder are energized or de-energized. When energized, a second cylinder 7 coaxially mounted with cylinder 1, is by a clutch device 8 locked to move in unison with the rotating cylinder 1; when the electro-magnets are de-energized, the second cylinder is unlocked, and stands at rest. A second brush-equipped electric terminal is borne by a second block 9, movable in ways 10, in parallelism with the surface of cylinder 7. A second lever 11, suitably slotted, engages the block 9, and by the swinging of lever 11 the block 9 is caused to move along its ways. The movement of lever 11 may by known means be made responsive to the absolute or static pressure on the upstream side of the orifice in the gas main. The surface of cylinder 7 is in part conducting and in part non-conducting, and, according as the brush borne by the block 9 engages a conducting or a non-conducting surface, electro-magnets 12 borne by cylinder 7 are energized or de-energized; and, according as these electro-magnets are energized or de-energized, a wheel 13, coaxially mounted with the cylinder 7, is caused alternately to rotate in unison with cylinder 7 and to stand at rest. Wheel 13 constitutes the initial rotating member of a tally 14.

Adjacent the tally 14, a shaft 15 is mounted for rotation, and the shaft 15 is geared with the tally 14, so that, as the integrating wheels of the tally 14 move to position to give a legible tally reading through a window 16, an integrated series of wheels responsive to the rotation of shaft 15 will bring a corresponding series of dies 17 to alignment in the position diagrammatically shown in Fig. II.

Opposite the face of the dies 17 constantly advance two strips of paper, moving in unison; one is a strip of transfer paper, the other a strip of plain paper. It will be understood that I here use the word paper as descriptive of the material which ordinarily will be used, and not by way of limitation; for, manifestly, webs of cloth or of other suitable material might be used with effect. Referring to Fig. II, the strip 18 may be understood to be a strip of plain paper, and strip 19 may be understood to be a strip of transfer paper having a coating of transferable material such as a preparation of lamp black on the surface toward the sheet of plain paper. These two strips are mounted on spools and are constantly advanced in unison by clockwork 20 through well-known mechanism, sufficiently indicated in the drawings.

A block 21 is provided, arranged in front of the face of the dies 17 and on the opposite side of the advancing strips 18 and 19. The block is pivoted at one end, and at the opposite end it carries a plate 22 which constitutes an armature for electro-magnets 23. When the electro-magnets are energized, the armature is attracted and the plate 21 is swung; when the magnets are de-energized the armature falls away, perhaps by gravity; or, if desired, a spring may be provided to insure such falling away. The plate so swung by the attraction of the armature to the magnets drives the superposed sheets upon the face of the dies and effects a print of the dies through the transfer paper and upon the strip 18 of plain paper.

The electro-magnets are energized periodically, and conveniently by means subject to the same clockwork 20 which drives the webs 18 and 19. As shown in the drawings the driven shaft 24 of the clockwork carries a disk 25. A make-and-break device in an electric circuit which includes a suitable source, and which includes also the windings of electro-magnets 23, is operated by the rotating disk, so that with each rotation there is a momentary energizing of the electro-magnets.

The circuit alluded to includes a terminal 26 borne by the disk 25 and an elastic terminal 27 extending adjacent that face of the disk from which the terminal 26 extends. The disk bears an abutment 28 which in the course of rotation engages terminal 27, draws it aside against its own, inherent tension, and then releases it. The terminal when, after being drawn aside, is is released springs back to its normal position (indicated in Fig. III in dotted lines) and, in doing so, makes and immediately breaks contact with terminal 26. This momentary closure of the circuit suffices to energize the magnets 23, and to swing plate 21 and effect an imprint of the dies upon the advancing strip 18; and, because the energizing is but momentary, the plate 21 immediately falls away; the imprint is sharp, and there is no appreciable interference with the continuous advance of strips 18 and 19.

I claim as my invention:

Recording apparatus including a control for periodic printing, such control including an electric circuit, a rotatable clock-driven member, a contact-piece borne by said rotatable member, and a second resilient contact-piece arranged adjacent said rotatable member and adapted to be engaged periodically by the said rotatable member as the said member rotates and to be drawn aside and released again, the two said contact-pieces being so arranged that the resilient contact-piece on release as aforesaid and in its return to normal position passes the companion contact-piece and makes and breaks an instantaneous contact therewith, the said contact-pieces being arranged in the said circuit.

In testimony whereof I have hereunto set my hand.

ARCHER E. YOUNG.